T. A. KLENKE & S. OLSEN.
CUSHIONING DEVICE FOR VEHICLES.
APPLICATION FILED FEB. 28, 1911.

1,119,018.

Patented Dec. 1, 1914.
10 SHEETS—SHEET 1.

T. A. KLENKE & S. OLSEN.
CUSHIONING DEVICE FOR VEHICLES.
APPLICATION FILED FEB. 28, 1911.

1,119,018.

Patented Dec. 1, 1914.
10 SHEETS—SHEET 4.

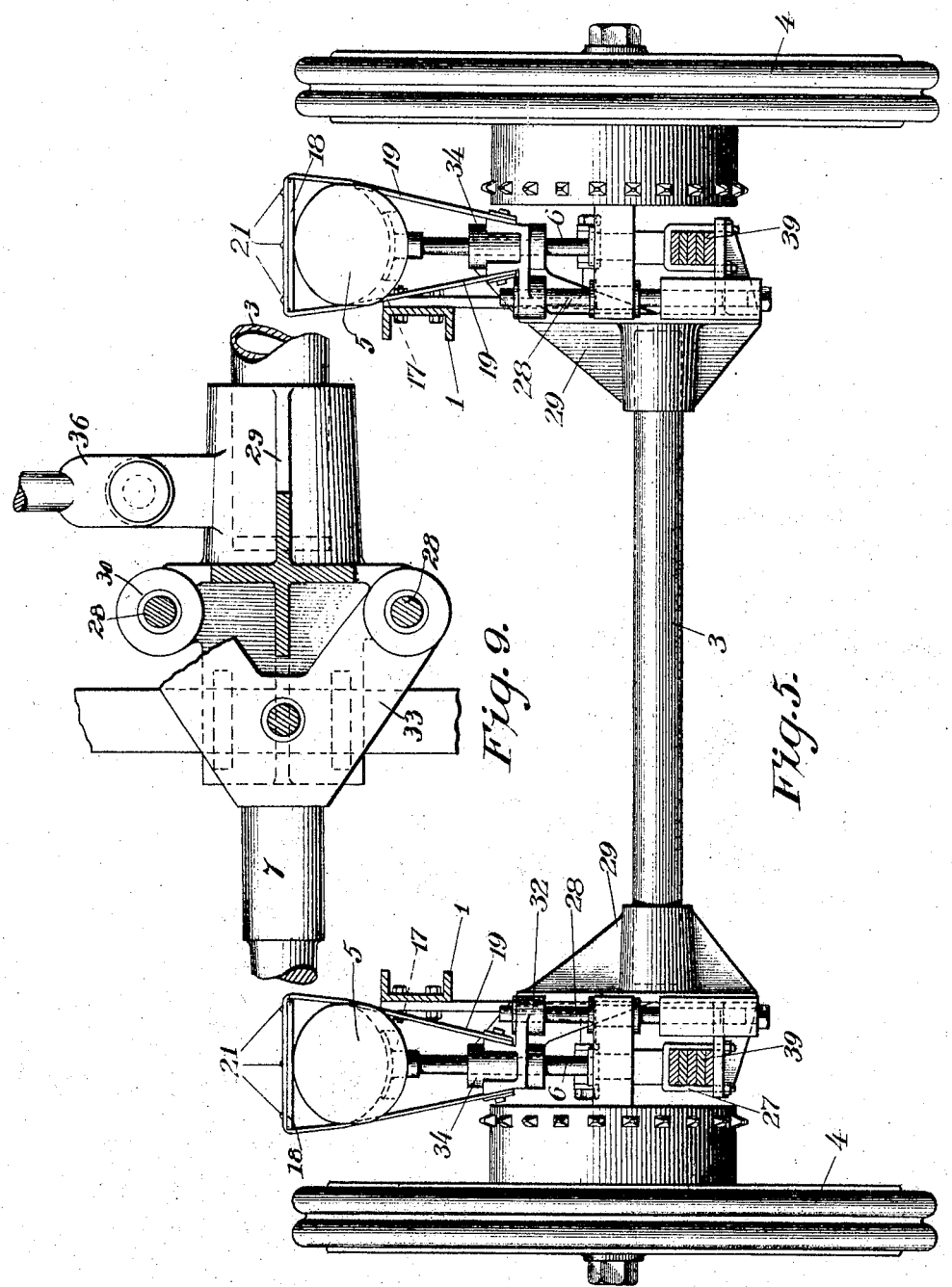

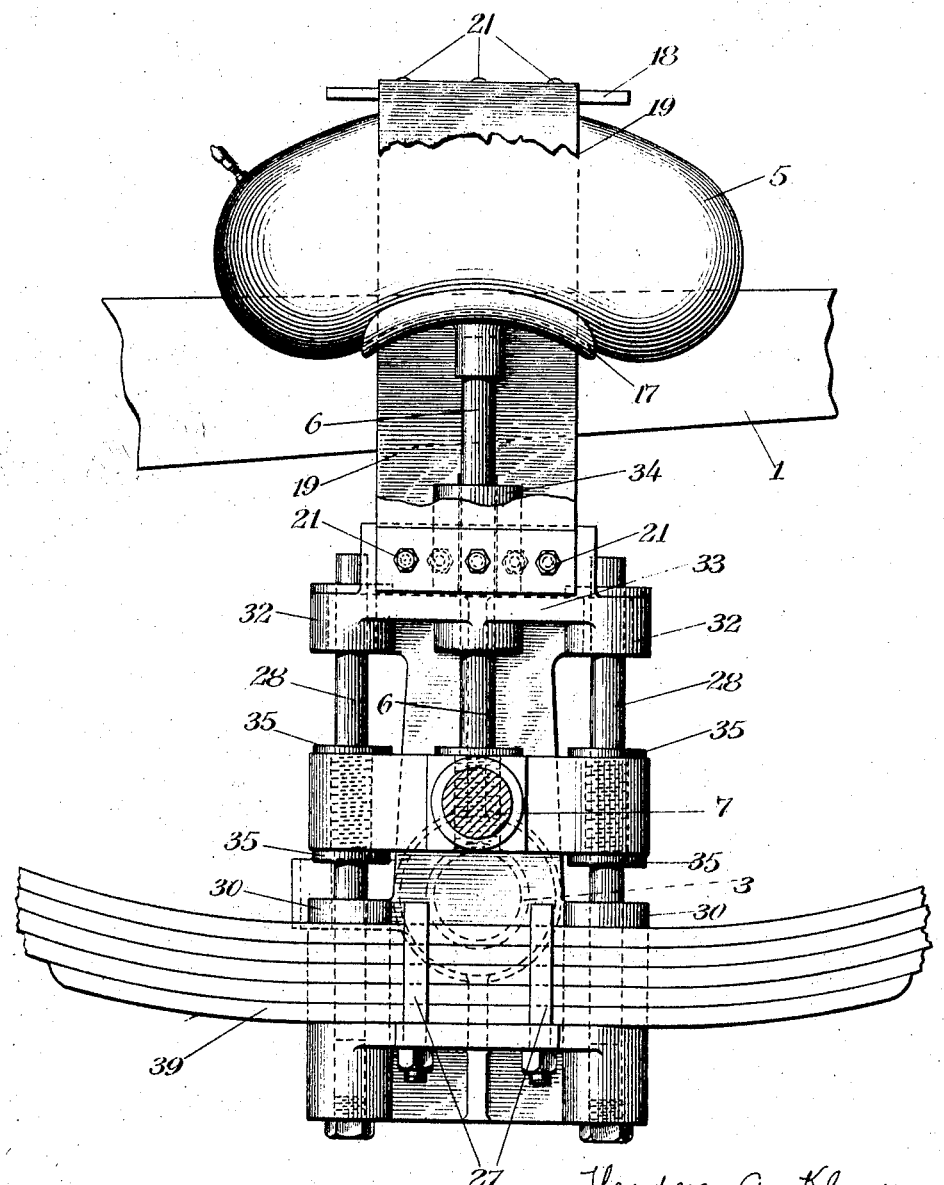

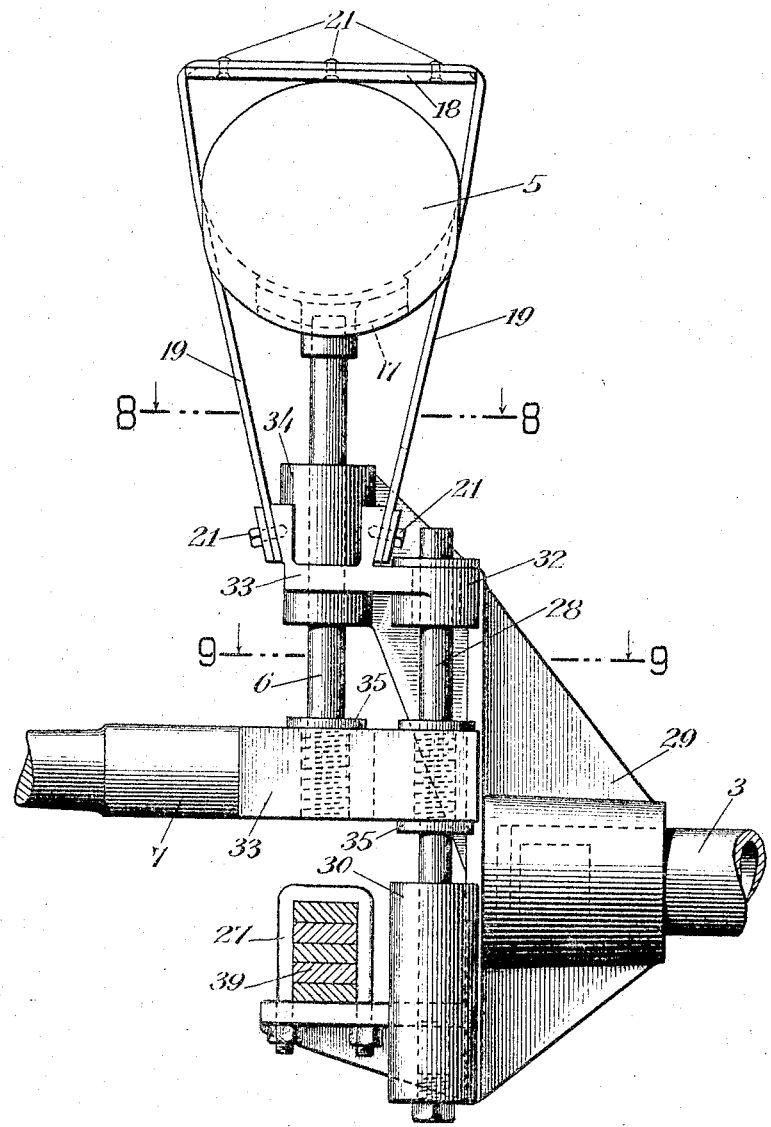

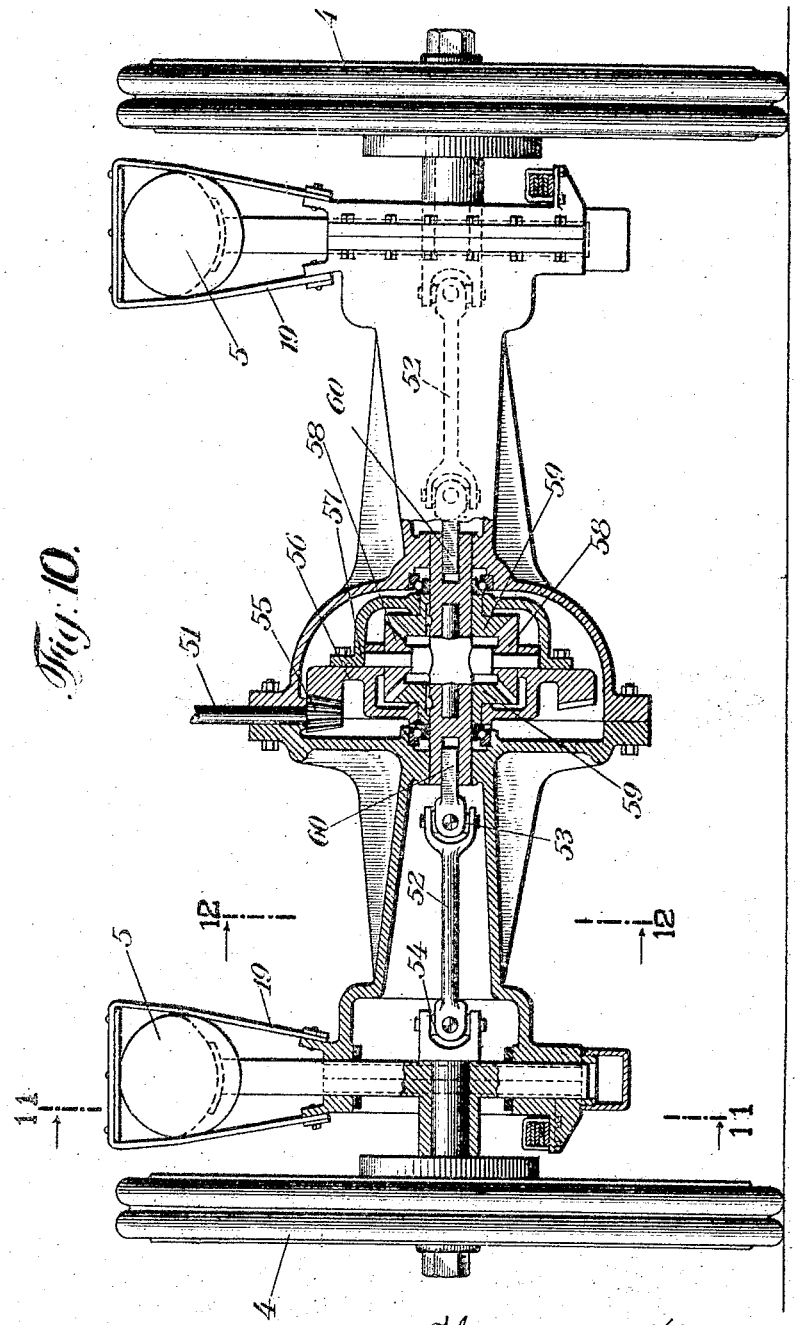

T. A. KLENKE & S. OLSEN.
CUSHIONING DEVICE FOR VEHICLES.
APPLICATION FILED FEB. 28, 1911.

1,119,018.

Patented Dec. 1, 1914.
10 SHEETS—SHEET 9.

Witnesses

Theodore A. Klenke
Sigward Olsen
Inventors

By Attorneys
Kenyon & Kenyon

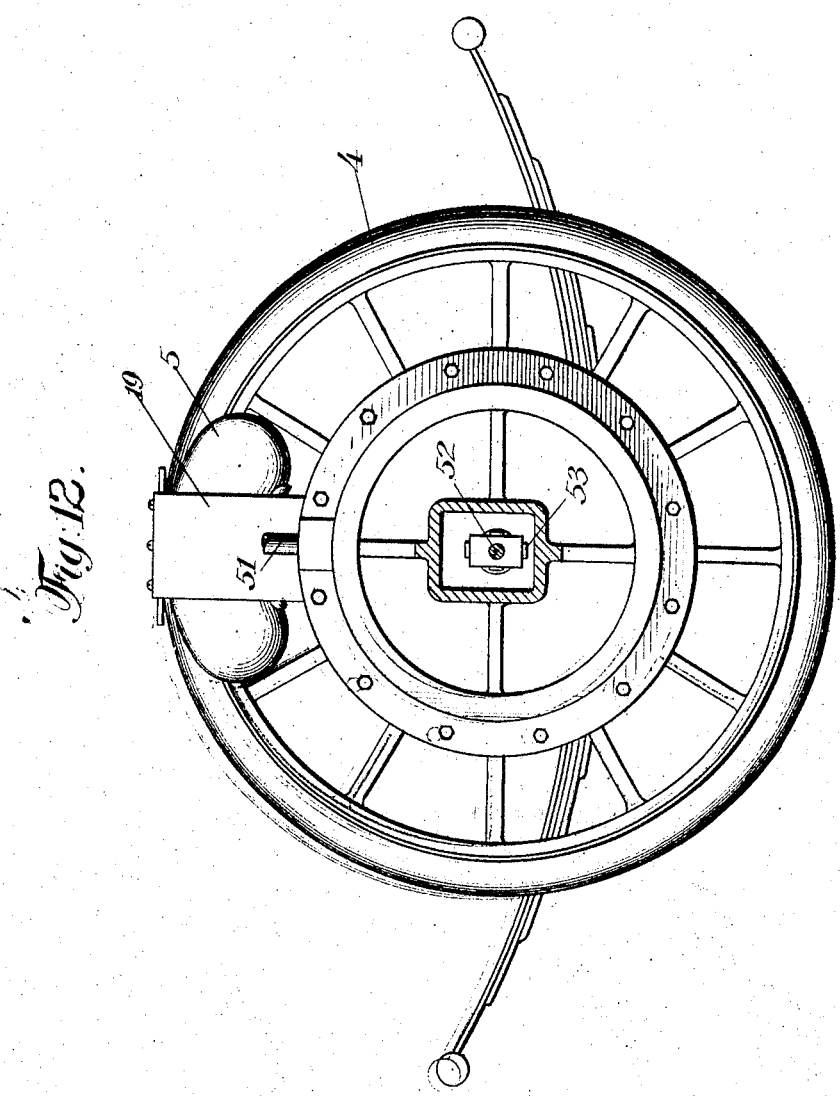

UNITED STATES PATENT OFFICE.

THEODORE A. KLENKE AND SIGWARD OLSEN, OF NEW YORK, N. Y., ASSIGNORS TO KLENKE CUSHION AXLE COMPANY, A CORPORATION OF NEW YORK.

CUSHIONING DEVICE FOR VEHICLES.

1,119,018.  Specification of Letters Patent.  Patented Dec. 1, 1914.

Application filed February 28, 1911. Serial No. 611,494.

*To all whom it may concern:*

Be it known that we, THEODORE A. KLENKE and SIGWARD OLSEN, both citizens of the United States, and residents, respectively, of New York city, county and State of New York, and New York city, county of Kings, borough of Brooklyn, and State of New York, have invented certain new and useful Improvements in Cushioning Devices for Vehicles, of which the following is a specification.

Our invention relates to vehicles, and especially to suspension devices adapted for use with pneumatic cushions between the wheels and the bed of vehicles.

Its object is to provide cushioning devices for vehicles including pneumatic cushions between the wheel and the bed, compact, simple and cheap in construction, durable and efficient in operation, easy of adjustment and easily adaptable and applicable to vehicles already constructed.

The invention consists in the novel devices and combinations herein shown and described.

In the accompanying drawings forming part of this specification, we have shown the preferred form of our improvement as embodied in an automobile, and we will now proceed to describe that preferred form as thus shown.

Figure 1:
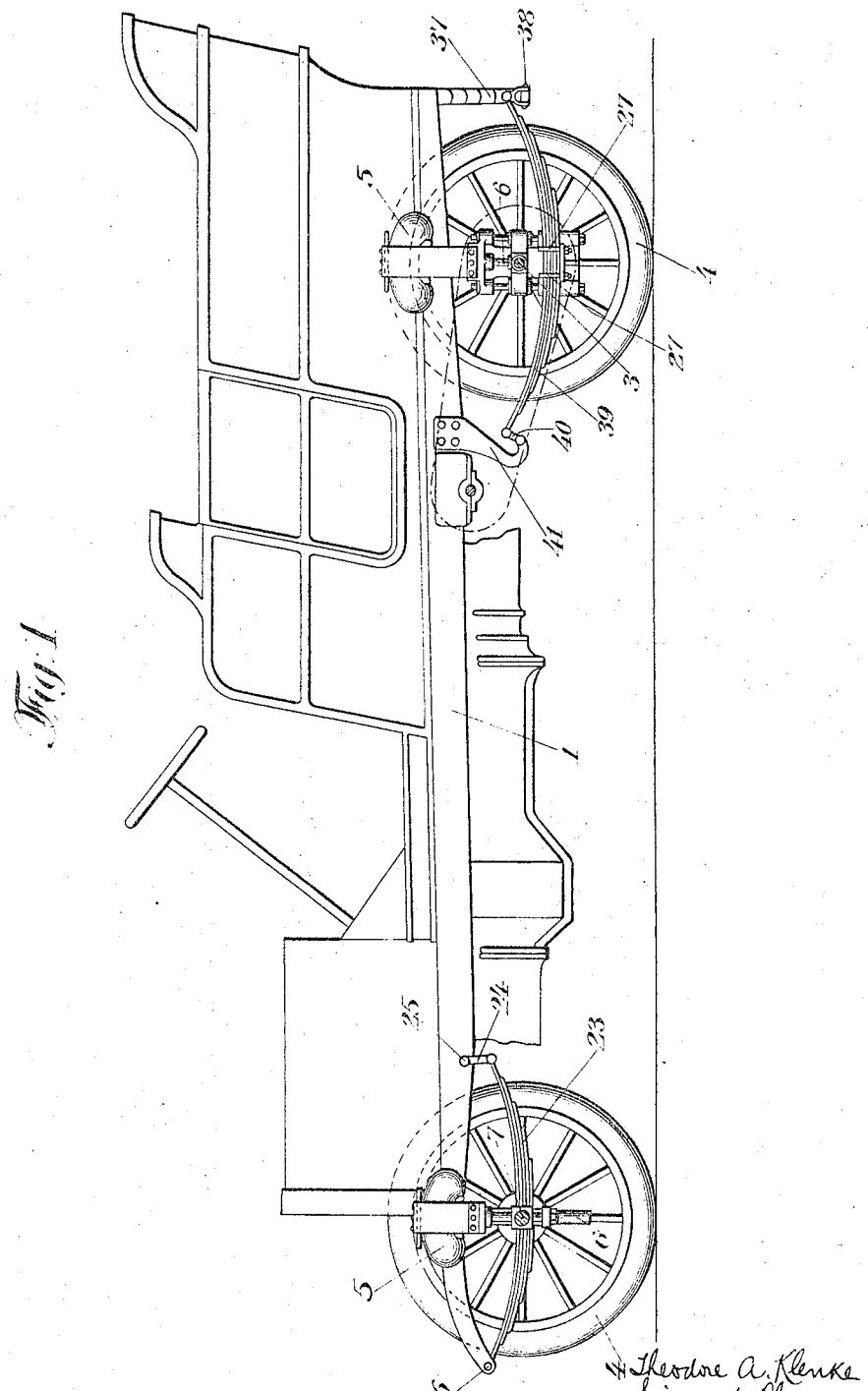
Figure 2:
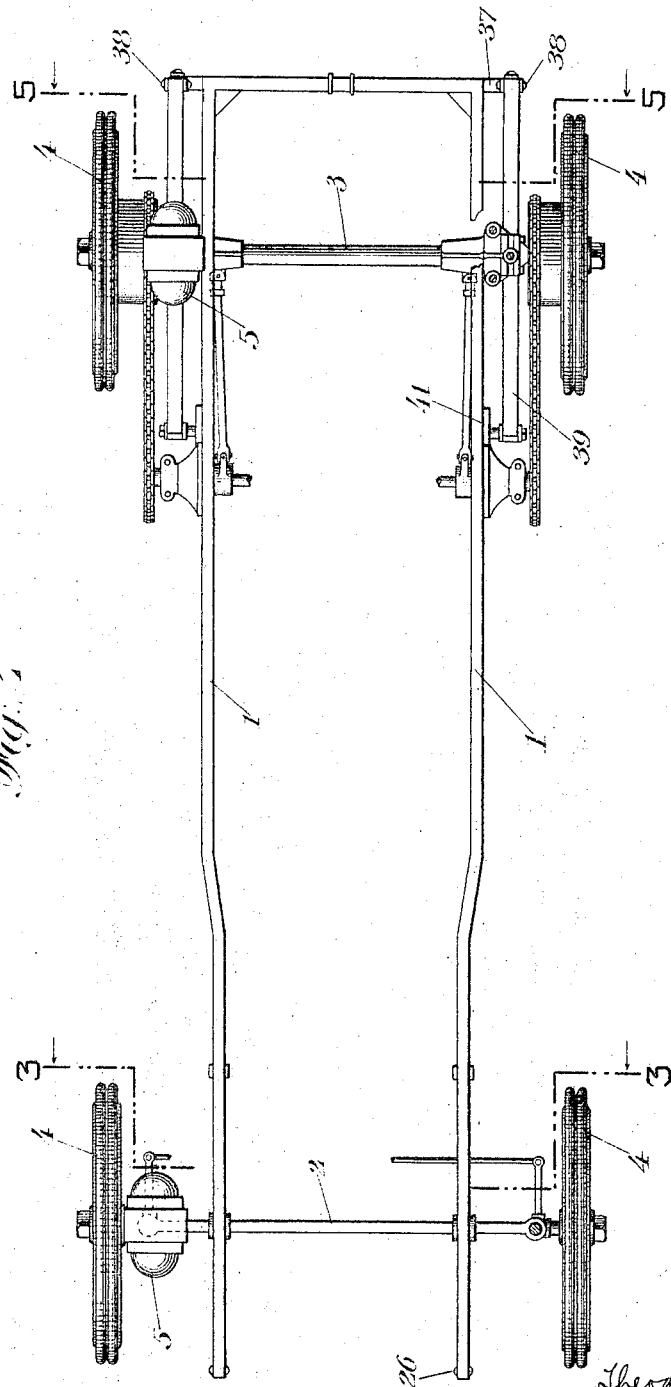
Figure 3:
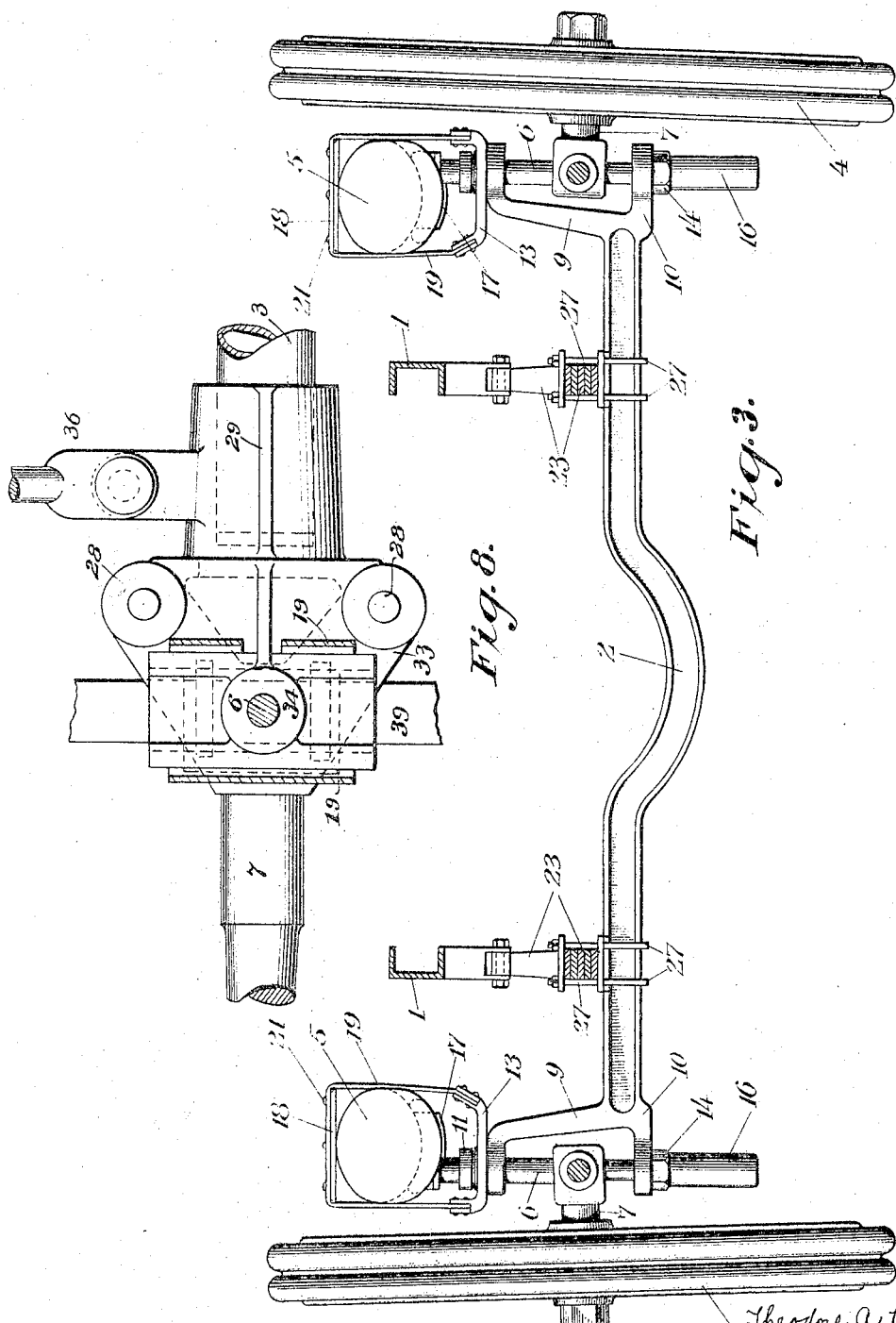
Figure 4:
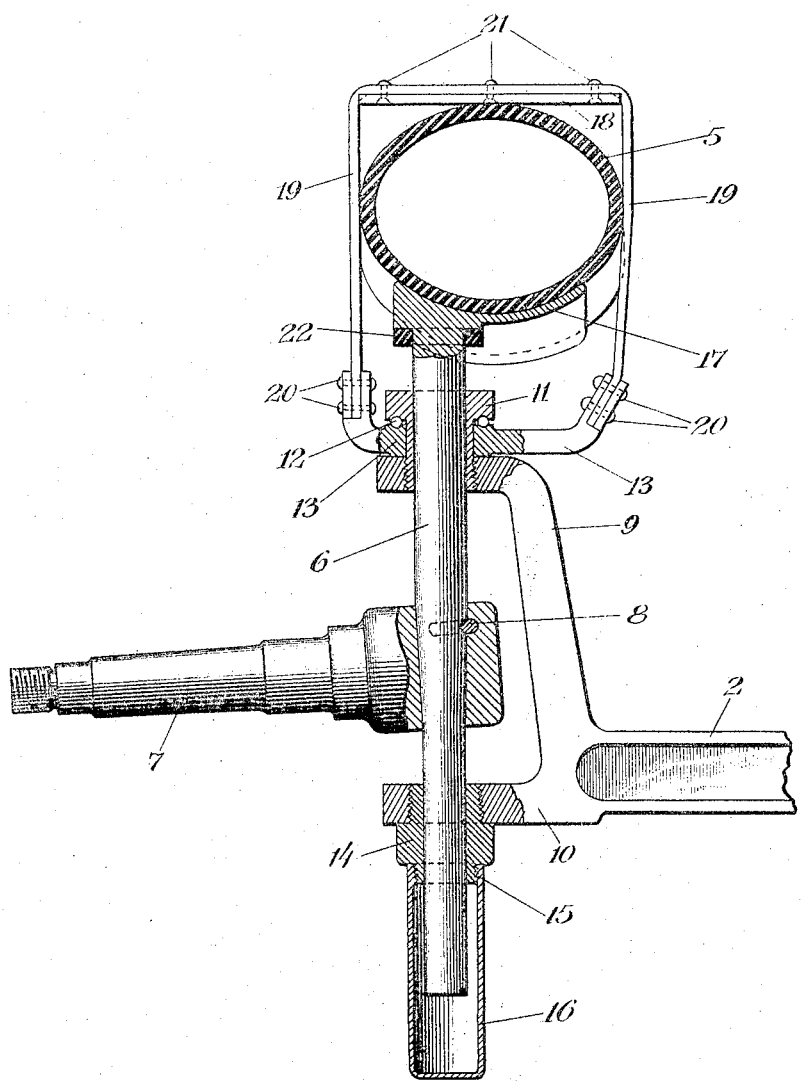
Figure 11:
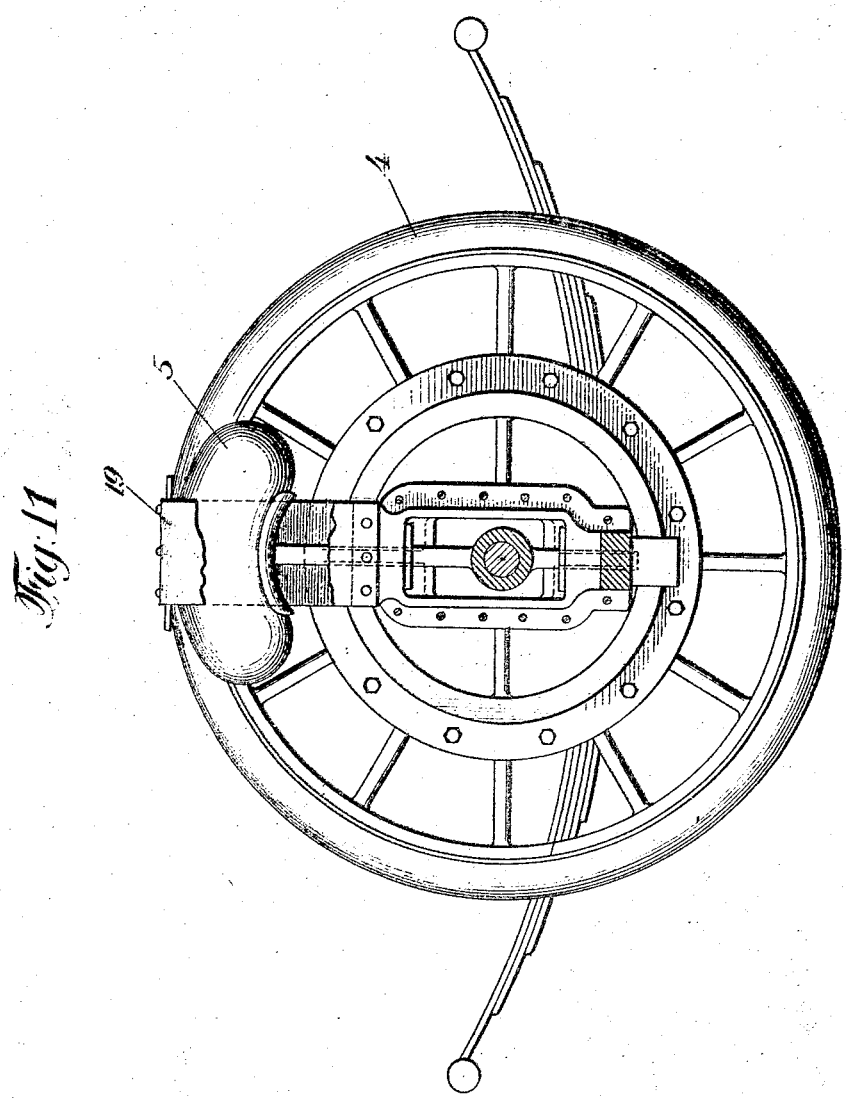

Referring to the drawings, Figure 1 is a side elevation of an automobile embodying our improvement in its preferred form, one side of the car being broken away to more clearly show the parts; Fig. 2 is a plan with the body of the car removed and certain parts broken away; Fig. 3 is a view of the front axle taken on the lines 3—3 of Fig. 2; Fig. 4 is an enlarged detail section through one of the pneumatic cushions and its supports and connections, showing the wheel pivot pin and a part of the front axle; Fig. 5 is a vertical section on the lines 5—5 of Fig. 2, showing the rear axle; Fig. 6 is a detail side elevation of a pneumatic cushion on the rear axle and connecting parts; Fig. 7 is an end elevation of Fig. 6, looking from the right toward the left, as viewed in Fig. 6; Figs. 8 and 9 are horizontal plan sections on lines 8—8 and 9—9 of Fig. 7; Figs. 10–12 show another modification for the rear axle of shaft-driven cars, Fig. 10 being a vertical section through the center of the differential, Fig. 11 a section on lines 11—11 of Fig. 10, and Fig. 12 a section on the lines 12—12 of Fig. 10.

Figs. 1–9 show our improvement as applied to chain-driven cars, Figs. 3 and 4 illustrating the application of the cushioning devices to the front axle, and Figs. 5 to 9, as adapted to the rear axle.

Referring first to Figs. 1 to 4, inclusive, 1 represents the body of the bed of the car, which may be of any desired construction, and which will not be further described. 2 is the front axle, 3 the rear axle, and 4 represents the wheels. 5 is a pneumatic cushion or bag. Of course, it will be understood that one of these is provided for each wheel. As the cushioning devices for one wheel are exactly like those of another except as modified to some extent for the rear axle, as distinguished from the front axle, we will confine our description of the cushioning device and its connections to those connected with one of the wheels only. The cushioning device is interposed between the wheel and the axle, so that the weight of the vehicle will be transmitted to the wheel through it and its connections, and all shocks and jars from the wheel will pass through them before being transmitted to the bed. Each front wheel is provided with a wheel pivot pin 6 fast with the wheel shaft and free to turn with it relatively to the axle 2. As shown, each front wheel 4 has a short wheel shaft 7 to which the wheel pivot pin 6 is fastened in any suitable way, as by pin 8. The end of the axle 2 is forked at 9 and 10, each branch being provided with a circular opening for the reception of the pivot pin 6, these openings furnishing bearings for the pin. 11 is a screw-threaded nut screwed into the opening in the branch 9 of the fork, and having an enlarged head provided with a circular recess in its lower part for the reception of the usual antifriction balls 12, which latter rest and rotate upon a plate 13. The fork 10 is provided with a screw-threaded nut 14 forming the lower bearing for pivot pin 6. It has a dependent flange 15 at its lower end, upon which is screwed a dependent oil cup 16. Pivot pin 6 moves freely vertically in its bearings and in the oil cup. The latter is provided for lubricating purposes, and also for the purpose of excluding dust from the lower bearing. Pneumatic cushion 5 is carried and supported by a lower support 17. Preferably, this is shown as a plate slightly curved, the better to support the pneumatic cushion to which, if desired, it may be secured in any suitable way. 18 is the upper support for the pneumatic cushion, and is preferably a plate resting upon the upper surface of the pneumatic cushion. Plate 13 and support 18 are connected by straps 19. As shown, these are made of leather. They are suitably riveted to plate 13 as at 20, and also to upper support 18 as at 21. The upper support 18 is adapted to transmit weight or pressure from the bed of the vehicle to the pneumatic cushion, and through it to the wheel. This is accomplished by the weight of the bed and axle pulling downward upon the enlarged head of screw-threaded nut 11, upon balls 12, plate 13 and straps 19. By means of the above described devices, supports 17 and 18 are free to move toward or away from each other, as shown, vertically, but in all other directions they are compelled to move together as a unit; thus, any longitudinal movement of the axle 2 or the wheel 4 relative to the bed, or any rocking movement on the axis of the axle 2 or the wheel shaft 7, is transmitted to both supports 17 and 18. The parallelism of these supports or plates 17 and 18 relative to each other is thus at all times maintained, although the plates are free to move vertically, or toward or away from each other, under the variations due to variations in weight, shock, etc. The straps 19 permit this vertical play and at the same time are sufficiently taut and rigid to compel the supports 17 and 18 to otherwise move together. Plate 13 is free to turn horizontally on the lower shaft of nut 11, this lower part being screw-threaded only where it enters the fork 9. From the construction of the parts shown above, any horizontal turning movement of the wheel is communicated to the lower support, pneumatic cushion, upper support, straps and plate 13, and, accordingly, the pneumatic cushion and its supports move as a unit with any horizontal turning movement of the wheel. The pneumatic cushion and its supports are always in the same position relative to the wheel. This produces a uniformity in the cushioning effects at all times. 22 is a rubber gasket to cushion any blow in striking the upper surface of the part 11. Any suitable means may be provided for connecting the axle 2 with the bed 1. These means should preferably be such as to permit a longitudinal and a rocking motion of the axle independently of the bed. The particular means we have shown for this purpose consist, for the front axle, of a spring 23 interposed between the axle and the bed. This spring is shown as pivoted at one end to a link 24 pivoted at 25 to the bed and at its other end it is pivoted to the bed at 26. The spring is secured to the axle by clips 27 in the usual manner. By the above means, an elastic connection is provided between the axle and bed sufficiently flexible to permit the axle, pneumatic cushion, wheel and connections to have a longitudinal and rocking movement substantially independent of the bed.

In Figs. 5 to 9, we have shown our improvement as applied to the rear axle of an automobile. In all substantial respects, it is similar to that already shown for the front axle, differing mainly in those parts which prevent the horizontal turning of the rear wheels. In order to prevent the wheel from turning, the wheel shaft 7 is not only provided with an integral pivot pin 6, but also with two other integral pins 28, 28. 29 is a bracket fast to the rear axle 3. This bracket is provided with two circular bearings 30, 30, into which project the lower parts of pins 28. Bracket 29 at its upper end, is provided with a bearing 32 for each of the pins 28, through which they project, as shown in Fig. 7. Bracket 29 is also provided with an extension 33 to which the straps 19 are riveted, and also with a circular hollow bearing 34 through which passes pivot pin 6. This pivot pin carries the lower support 17 for the pneumatic cushion 5. It will be understood, of course, that the weight is transmitted from the bed and axle through the straps 19, support 18, pneumatic cushion, pivot pin 6, to the wheel, in the manner already described. The pivot pins 6, 28 and 28 permit the vertical movement of the parts, but prevent any turning of the wheel in a horizontal plane. Such turning could, of course, be prevented in many other ways. Any suitable means for the purpose may be employed. 35, 35 are rubber washers to prevent the knocking of wheel shaft 7 against bearings 30 and 32. 36 is the usual radius rod. The particular means shown between the rear axle and the bed for permitting longitudinal and rocking motions, consists of a cross spring 37 (Fig. 1) secured at its center to the bed and at each end pivoted at 38 to a side spring 39, the latter passing through the clips 27 secured to the axle, and at its further end being pivoted to a link 40 pivoted to bracket 41 depending from bed 1.

All of the devices above described are especially adapted for use with chain-driven cars. With suitable modifications, our devices may, of course, be used with shaft-driven cars.

By means of our improvement, very simple, compact and efficient cushioning devices are provided, durable and efficient in operation, and easily adaptable to cars already built. The cushioning effects are always uniform. The supports for the pneumatic cushion are always maintained in parallelism with each other, so that no strains or stresses pass through the pneumatic cushion itself, and at the same time the supports are free to move toward or away from each other to bring the varying pressures upon the pneumatic cushion. We are thus enabled to use pneumatic cushions or bags as there is no appreciable side strain or wear upon them. Each wheel is free to move vertically relatively to the axle and bed and independently of the other wheels carrying with it in this relative movement its cushioning device and supports. This enables each wheel to respond to shocks or to irregularities in the roadway independently of the other wheels and also of the axle and without the necessity of thereby moving the whole axle. Accordingly, each wheel can respond to such shocks and irregularities more quickly and easily thus causing the vehicle to ride more easily and evenly. Where desired, the wheel and its cushion device and supports are also free to rotate in a horizontal plane independently of the axle and bed. By means of our improved construction the pneumatic cushions and connecting parts can be readily removed for purposes of repair and replacement.

Many other changes and modifications than those herein specifically suggested could be made without departing from our invention.

Having thus described our invention, what we claim as new and desire to secure by Letters Patent, is:

1. In a vehicle, the combination of a wheel, an axle, a wheel pivot pin fast with the wheel shaft but free to turn relatively to the axle, a support for a pneumatic bag carried by the pivot pin, a pneumatic bag carried by said support, a support connected with the axle and resting upon the pneumatic bag and adapted to transmit weight from the axle to the pneumatic bag, and connections between the two supports permitting them to move toward or away from each other in a direct line but causing them to move together rigidly as a unit in all other directions.

2. In the connections between the wheel and axle of a vehicle the combination of a pneumatic bag and two supports therefor on opposite sides thereof for transmitting weight from the axle to the wheel, and a wheel pivot pin, carrying the lower of said supports, the pivot pin, supports and bag being so connected that while permitting the supports to move toward or away from each other in a direct line, the parts will otherwise move together rigidly as a unit.

3. In the running gear of a vehicle, a wheel pivot pin and a pneumatic bag carried by said pin and movable therewith and adapted to transmit weight from the axle and bed to the wheel.

4. In the running gear of a vehicle, a wheel pivot pin and a pneumatic bag, a support therefor carried by the said pin, a support resting upon the pneumatic bag adapted to transmit weight from the axle and bed to the said device, and connections between the two supports causing them to move together rigidly as a unit except toward and away from each other.

5. In the running gear of a vehicle, a wheel pivot pin and a support for a pneumatic bag carried by said pin and movable therewith.

6. In the running gear of a vehicle, a wheel pivot pin, a pneumatic bag carried thereby and movable therewith, a support resting upon the pneumatic bag and adapted to transmit to it weight from the axle and bed, and connections between the pin and support adapted to permit the support to compress the bag vertically and to cause the support and bag to move together rigidly otherwise as a unit.

7. In the running gear of a vehicle, a wheel pivot pin, fast with the wheel shaft but free to turn on the axle or bed in a horizontal plane, and a pneumatic bag for the vehicle carried by said pin and free to turn with it in a horizontal plane.

8. In the running gear of a vehicle, a wheel pivot pin, fast with the wheel shaft but free to turn on the axle or bed in a horizontal plane, a pneumatic bag and a support therefor carried by the pin and free to turn with it in a horizontal plane, the support carrying the pneumatic bag.

9. In the running gear of a vehicle, a wheel pivot pin, a pneumatic bag carried thereby and a support resting upon the bag and adapted to transmit weight from the bed of the vehicle to compress the bag vertically, the pin, bag and support being so connected as to turn rigidly together in a horizontal plane and to move together rigidly in every direction except vertically.

10. In the running gear of a vehicle, a wheel pivot pin, a pneumatic bag carried thereby, a support resting upon the bag, connections between the axle and said support adapted to transmit weight from the former to the latter, including straps flexible vertically but rigid otherwise.

11. In the running gear of a vehicle, a wheel pivot pin, a pneumatic bag carried thereby, a support resting upon the bag, connections between the axle, pin, bag and support adapted to transmit weight from the axle to the support and to permit the support to move vertically relatively to the bag and pin to compress the bag but compelling the support, bag and pin otherwise to move rigidly as a unit.

12. In the running gear of a vehicle, a wheel pivot pin, a pneumatic bag carried thereby, a support resting upon the bag, connections between the axle, pin, bag and support adapted to transmit weight from the axle to the support and to permit the support to move vertically relatively to the bag and pin to compress the bag but compelling the support, bag and pin otherwise to move as a unit, the said connections including straps flexible vertically but rigid otherwise.

13. In the running gear of a vehicle, a wheel pivot pin mounted in bearings of the axle and free to turn in a horizontal plane independently of the axle, a pneumatic bag, a support integral with the pin to which the pneumatic bag is secured and upon which it rests, a support resting upon the bag and secured thereto, a plate surrounding the pin and connected with the axle so as to carry its weight, but free to turn in a horizontal plane independently of the axle, straps vertically flexible but otherwise rigid connecting the plate and upper support, all connected and arranged so that the upper support may move vertically relatively to the lower support and pin to compress the pneumatic bag and so that the support, bag and plate will turn in a horizontal plane and move in all other directions except vertically as a unit.

14. In a vehicle, the combination of a wheel, an axle, a cushioning device, two supports, one support connected with the axle and adapted to rest upon the cushioning device to transmit to it weight from the axle, and the other support connected with the wheel and adapted to transmit the said weight to the wheel, connections between the two supports permitting them to move toward or away from each other in a direct line, but causing them to move together rigidly as a unit in all other directions, a bed, and resilient means interposed between the axle and the bed permitting the axle to rock and to move longitudinally relatively to the bed.

15. In a vehicle, the combination of a wheel, an axle, a pneumatic bag, two supports, one support connected with the axle and adapted to rest upon the pneumatic bag to transmit to it weight from the axle, and the other support connected with the wheel and adapted to transmit the said weight to the wheel, connections between the two supports permitting them to move toward or away from each other in a direct line, but causing them to move together rigidly as a unit in all other directions, a bed, and resilient means interposed between the axle and the bed permitting the axle to rock and to move longitudinally relatively to the bed.

16. In a vehicle, the combination of a wheel, an axle, a wheel shaft pivot pin fast with the wheel but free to turn relatively to the axle, a support for a cushioning device carried by the pivot pin, a cushioning device carried by said support, a support connected with the axle and resting upon the cushioning device and adapted to transmit weight from the axle to the cushioning device, connections between the two supports permitting them to move toward or away from each other in a direct line but causing them to move together rigidly as a unit in all other directions, a bed, and resilient means interposed between the axle and the bed permitting the axle to rock and to move longitudinally relatively to the bed.

17. In the running gear of a vehicle, the combination of an axle and a wheel so connected as to be capable of vertical movement relative to each other, a pneumatic bag carried by the wheel and movable with the wheel and connected to the axle so as to carry the weight of the axle, a bed, and resilient means interposed between the axle and the bed permitting the axle to rock and to move longitudinally relatively to the bed.

18. In the running gear of a vehicle, the combination of an axle, a wheel pivoted upon the axle so as to swing in a horizontal plane and free to move vertically relatively to the axle, a pneumatic bag carried by the wheel and carrying the weight of the axle and vehicle and movable with the wheel, a bed, and resilient means interposed between the axle and the bed permitting the axle to rock and to move longitudinally relatively to the bed.

In testimony whereof, we have signed our names to this specification, in the presence of two subscribing witnesses.

THEODORE A. KLENKE.
SIGWARD OLSEN.

Witnesses for T. A. Klenke:
  THOMAS H. BAINTAN,
  NATHAN CRANSTON.
Witnesses for Sigward Olsen:
  CHRIS. G. HUPFEL,
  WM. H. KLENKE.